Aug. 19, 1930.  G. RAYMOND  1,773,373
SAFETY HOOK
Original Filed Aug. 1, 1927
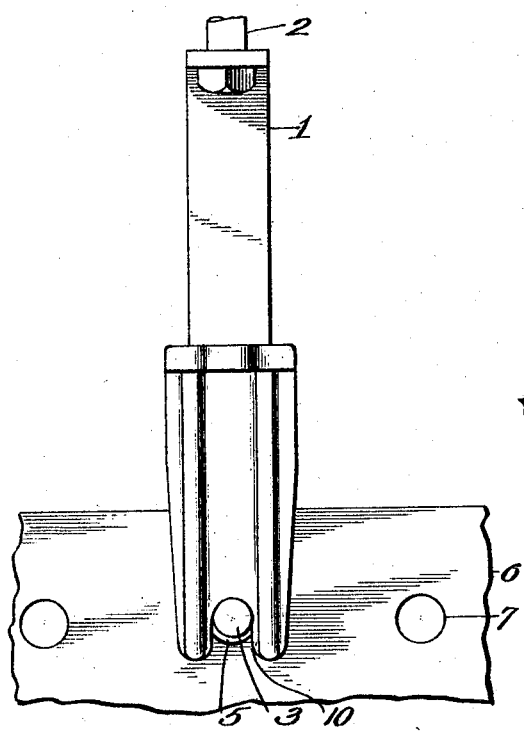
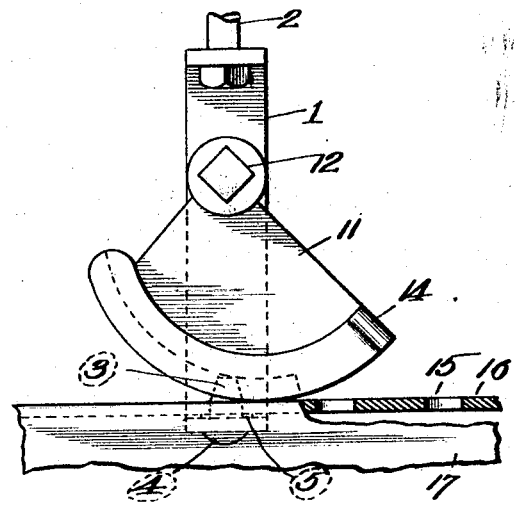
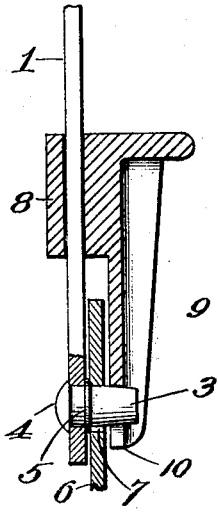
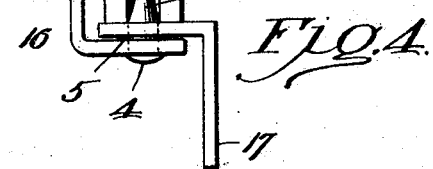
INVENTOR.
Gwynne Raymond
BY
Thorpe & Thorpe ATTORNEYS.

Patented Aug. 19, 1930

1,773,373

UNITED STATES PATENT OFFICE

GWYNNE RAYMOND, OF KANSAS CITY, MISSOURI, ASSIGNOR TO BLACK, SIVALLS & BRYSON MANUFACTURING COMPANY, OF KANSAS CITY, MISSOURI, A CORPORATION OF DELAWARE

SAFETY HOOK

Original application filed August 1, 1927, Serial No. 209,802. Divided and this application filed March 19, 1928. Serial No. 262,950.

This invention relates to safety hooks for the suspension of plates and the like having holes or perforations adjacent their margins, and is particularly designed for use in holding plates while they are being painted and also in the suspension of the plates from overhead conveyors, said safety hooks of the invention being provided with automatic means which positively prevent accidental detachment of the load. This application forms a divisional application of my copending case filed August 1, 1927, Ser. No. 209,802.

The chief object of the invention is to provide an automatic locking means which cannot become accidentally unlocked, but must be manually moved to inoperative position before a plate can be removed from the suspension hook.

Another object of the invention is to produce a device of the character outlined which is of strong, durable, efficient and inexpensive construction; and in order that it may be fully understood, reference is to be had to the accompanying drawing, in which:—

Figure 1 is a front elevation of a safety hook adapted for the suspension of vertical-edged plates.

Figure 2 is a central vertical section through Figure 1.

Figure 3 is a front elevation of a safety hook adapted for the suspension of horizontal-edged plates.

Figure 4 is an edge view of the device shown in Figure 3.

In the said drawing, where like reference characters identify corresponding parts in all of the figures, 1 indicates a suspension strap or body member having its upper end bent at right angles and rotatively mounted on a bolt 2, although, of course, the strap may be supported in any suitable manner.

The strap 1 adjacent its lower end, it being noted that the end of the strap in Figures 3 and 4 is bent at right angles, carries a projecting pin 3, held tightly in position by the opposing engagement on opposite sides of the strap of a large head 4 and a circumferential flange or collar 5 formed integrally with the pin.

In Figures 1 and 2, a vertical-edged plate 6 is illustrated as in suspended position. The margin of the plate is formed with a series of perforations 7, one of said perforations having been engaged with the pin 3 for the suspension of the plate, it being here understood that the perforation 7 engaged by the pin may be a special opening for the suspension of the plate and not a common opening as occurs in the manufacture of tank plates and the like.

To lock the plate in engaged position, the strap 1 slidably carries a locking or catch member comprising a heavy body portion 8 formed with a downwardly projecting catch extension 9, spaced from the strap a distance equal to the maximum gage material the hook is designed to support. The lower end of the spaced extension is notched or recessed as at 10 for the reception of the pin 3 which prevents the catch from moving downwardly beyond a predetermined point. The length of the extension 9 is determined by the distance from the margin of the plate to the perforation to be engaged by the pin.

The operator, in order to attach a plate, pushes the catch 8 upwardly, engages the pin 3 with an opening 7 in the plate and then releases the catch which immediately falls, its extension portion 9 overlaps the plate in opposition to the body member 1 and thus securely retains the same in opposition to said body member against accidental dislodgment. It will be apparent with the bent strap shown in Figures 3 and 4 for engagement with a flanged or horizontal-edged plate, that the freely sliding catch of Figures 1 and 2 cannot be employed.

Therefore, in Figures 3 and 4, the catch comprises a cam 11 pivoted on a bolt 12 permanently secured to the vertical portion of the strap or body member 1. The face of the cam is provided with a groove 13 to receive the pin 3 and is so proportioned that it will accommodate any gage metal up to a predetermined maximum. For the convenience of the operator in moving the cam 11, its rear extremity is provided with a pair of outwardly projecting grip portions 14.

With a device of the character above-described a perforation 15 in the flange 16 of a plate 17 is engaged with the pin 3 while the operator is manually holding the pivoted cam lock 11 swung upwardly, the pin 3 having passed out of the open end of the slot 13. The operator then releases the cam lock 11 and it immediately swings downwardly until the face of the cam comes into abutment with the flange of the plate. Any tendency of the plate to move upwardly will be resisted by the catch. When it is desired to remove the plate, the catch must be swung by the operator until the groove 13 passes beyond the pin so that the plate may be lifted vertically to disengage same from the pin. It will be evident that the hole 15 engaged by the pin may be a special hole for the purpose rather than a common hole of a series as illustrated.

From the above description, it will be apparent that I have produced devices which possesses all of the features of advantage set forth as desirable and, while I have described and claimed the preferred embodiment of the invention, it is to be understood that I reserve the right to make all changes properly falling within the spirit and scope of the appended claims.

I claim:—

1. A safety hook comprising a body member having suspension means at one end and being formed at its other end with a projection extending substantially at right angles to the body member and being adapted for insertion into a perforated plate, and a catch movably mounted and guided on the body member so that when the body member is engaged with a plate and is in a vertical position, the catch will gravitate to closed position on the opposite side of the plate from said body member.

2. A safety hook comprising a body member having suspension means at one end and being provided at its other end with a projection extending substantially at right angles to the body member and being adapted for insertion into a perforated plate, and a catch having a slot to receive said pin and being movably mounted and guided on the body member so that when the body member is engaged with a plate and is in vertical position, the catch will gravitate to closed position on the opposite side of the plate from said body member and will have its slot in engagement with said pin.

3. A safety hook comprising a body member having suspension means at one end and being provided at its other end with a projection extending substantially at right angles to the body member and being adapted for insertion into a perforated plate, and a catch having a slot to receive said pin and being slidable on the body member so that when the body member is engaged with a plate and is in vertical position, the catch will gravitate to closed position on the opposite side of said plate from said body member with its slot in engagement with said projecting pin.

4. A safety hook comprising a body member having suspension means at one end and being formed at its other end with a projection extending substantially at right angles to the body member and being adapted for insertion into a perforated plate, and a catch pivotally mounted and guided on the body member so that when the body member is engaged with a plate and is in a vertical position, the catch will gravitate to closed position on the oposite side of the plate from said body member.

5. A safety hook comprising a body member having suspension means at one end and having its other end bent at right angles, said right angle extremity having a projection extending at substantially right angles thereto and being adapted for insertion into a perforated plate, and a catch pivotally mounted and guided on the body member so that when the body member is engaged with a plate and is in a vertical position, the catch will gravitate to closed position on the opposite side of the plate from the engaged portion of the body member.

In testimony whereof I affix my signature.

GWYNNE RAYMOND.